ical-mogul corporation patent document

United States Patent [19]
Smith et al.

[11] Patent Number: 5,245,741
[45] Date of Patent: Sep. 21, 1993

[54] MACHINED SHAFT SEAL WITH REINFORCING RING

[75] Inventors: Stanley N. Smith, Farmington; William Q. Laflin, Grass Lake; Keith G. Arenz, Novi, all of Mich.

[73] Assignee: Federal-Mogul Corporation, Southfield, Mich.

[21] Appl. No.: 911,995

[22] Filed: Jul. 10, 1992

Related U.S. Application Data

[63] Continuation of Ser. No. 744,775, Aug. 14, 1991, abandoned.

[51] Int. Cl.⁵ ............................................. B23P 11/02
[52] U.S. Cl. .................................... 29/450; 29/453; 264/163; 277/37; 277/153
[58] Field of Search ............... 277/37, 152, 153, 1; 425/DIG. 47; 264/138, 159, 163, 310, 320; 29/450, 453

[56] References Cited

U.S. PATENT DOCUMENTS

| | | | |
|---|---|---|---|
| 2,950,506 | 8/1960 | Corsi | 425/DIG. 47 |
| 3,275,331 | 9/1966 | Mastrobattista et al. | 277/1 |
| 3,614,183 | 10/1971 | Berens | 277/37 |
| 3,805,352 | 4/1974 | de Montremy | 277/217 |
| 3,857,156 | 12/1974 | Clark | 264/159 |
| 4,083,567 | 4/1978 | Thumm | 277/37 |
| 4,108,447 | 8/1978 | Scholin | 277/153 |
| 4,497,496 | 2/1985 | Repella | 277/152 |
| 4,501,431 | 2/1985 | Peisker | 277/152 |
| 4,542,573 | 9/1985 | Bainard | 277/1 |
| 4,723,350 | 2/1988 | Kobayashi et al. | 277/152 |
| 4,867,926 | 9/1989 | Matsushima | 277/153 |
| 5,104,603 | 4/1992 | Saitoh | 425/DIG. 47 |

FOREIGN PATENT DOCUMENTS

| | | | |
|---|---|---|---|
| 0623835 | 5/1949 | United Kingdom | 277/153 |
| 0625604 | 6/1949 | United Kingdom | 277/153 |
| 2082270 | 3/1982 | United Kingdom | 277/153 |

Primary Examiner—William A. Cuchlinski, Jr.
Assistant Examiner—Daniel G. DePumpo
Attorney, Agent, or Firm—Lawrence J. Shurupoff

[57] ABSTRACT

A shaft seal that includes a one-piece annular resilient seal element having an outer surface in static contact with a housing bore surface and an inner surface in rubbing contact with a circular shaft surface. A reinforcement ring is inserted into an internal cavity within the seal element to exert an outward radial force on an axial wall portion of the resilient seal element. The shaft seal can be manufactured at relatively low cost in small production quantities, using relatively low cost multipurpose tooling.

5 Claims, 1 Drawing Sheet

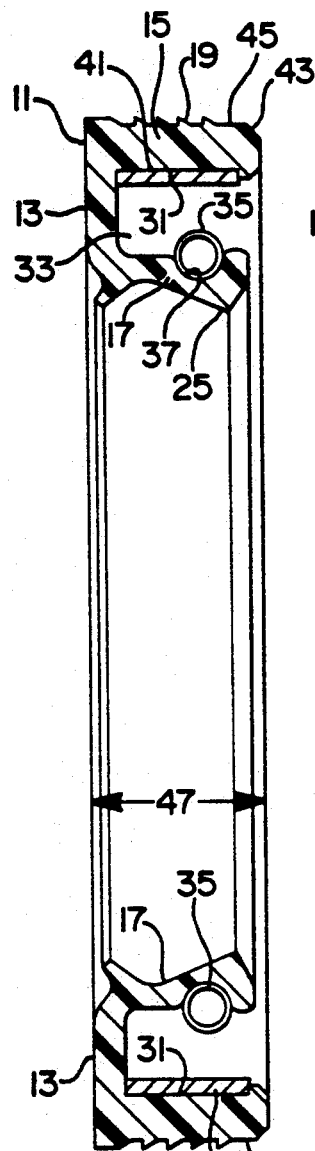
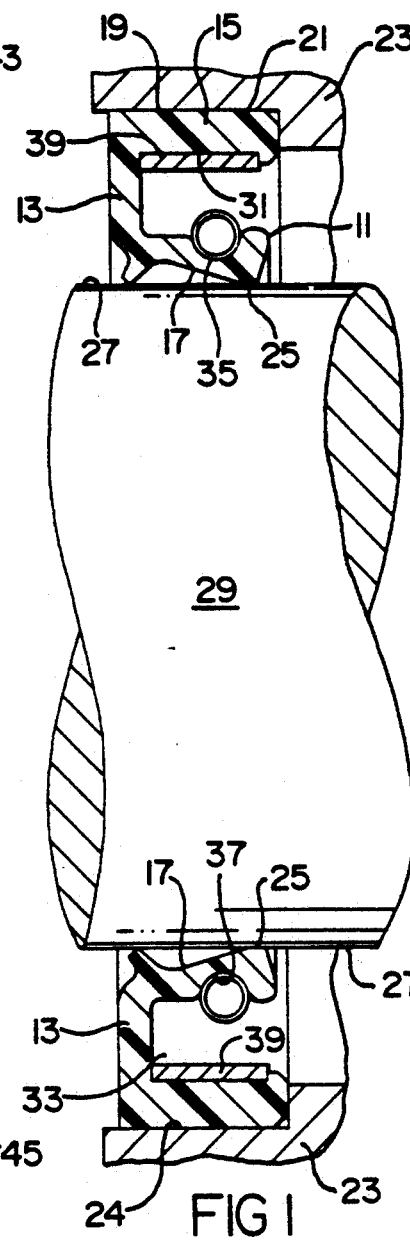
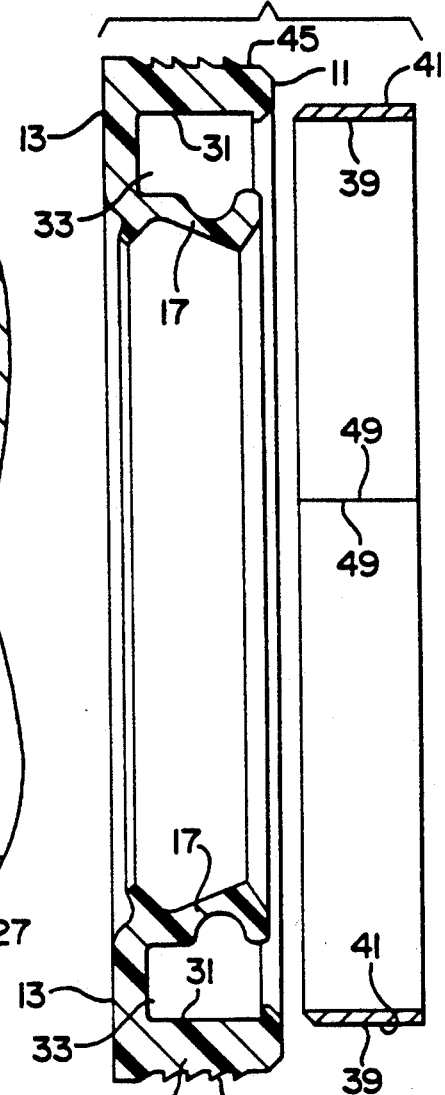
FIG 2  FIG 1  FIG 3
FIG 4

MACHINED SHAFT SEAL WITH REINFORCING RING

This is a continuation of co-pending application Ser. No. 07/744,775 filed on Aug. 14, 1991 now abandoned.

BACKGROUND OF THE INVENTION

1. Field of the Invention

This invention relates to a shaft seal machined from a plastic or elastomeric material and radially reinforced with a metal ring fabricated from welded sheet stock.

2. Description of Prior Developments

Conventional shaft seals often include an annular metal case having a radial flange upon which is mounted a resilient deformable seal element. In use, the inner radial edge or lip of the seal element engages the outer surface of an associated shaft while the outer surface of the metal case is inserted within a cylindrical bore formed in the housing. Often an elastomeric ring or sleeve is provided on the outer side surface of the case to form a static seal with the bore surface.

Conventional shaft seals have relatively low unit costs when produced in large volume quantities. However, in recent years inventory considerations have forced seal manufacturers to seek alternative manufacturing procedures for economical seal production in low volume quantities, e.g. one hundred units or less.

Using conventional manufacturing procedures, part of the cost of seal manufacture includes the costs for storing the tooling, and the costs involved in setting up or changing the tooling. When the tooling is used for large volume manufacture, the tooling costs can be amortized or averaged out to achieve a relatively small unit production cost. However, when small volume production is contemplated, it may not be economically feasible to use conventional production techniques.

Attempts to machine small quantities of shaft seals from plastic stock material using conventional tooling which is not part-specific have met with limited success. Such seals, which do not include metal cases, experience creep after their initial break-in and thus cannot maintain adequate sealing contact with the bores within which they are mounted. Although some plastic or elastomeric seals have been reinforced with internal supports, these seals have not met with wide commercial acceptance or success.

U.S. Pat. No. 4,108,447 to Scholin illustrates a shaft seal with an annular molded elastomeric sealing element reinforced and supported by a metal washer and a C-shaped spring band. The washer and C-shaped band are inserted into the sealing element after formation of the sealing element. However, the sealing element is molded in a cavity within a conventional molding apparatus which is part-specific and thus not well economically suited to low volume production runs. The phrase "part-specific" refers to tooling which is adapted to produce only one specific size or shape of a part such as an oil seal.

SUMMARY OF THE INVENTION

The present invention is directed to a shaft seal that can be manufactured with minimal use of special tooling, i.e. tooling such as metal forming dies and elastomer molding equipment having part-specific configurations designed only for producing specifically sized parts.

A shaft seal according to the present invention includes a one-piece annular elastomeric seal element having an outer side surface insertable into a housing bore and an inner side surface surrounding a circular shaft. An annular metal reinforcement tube or sleeve is insertable into an internal annular cavity machined in the elastomeric seal element for pressurizing the seal element against the bore surface, thereby securely mounting the shaft seal assembly in the housing bore.

In a preferred practice of the invention, the elastomeric seal element shape is machined from the end of an elastomeric billet and then parted off the billet. The seal element is machined in accordance with conventional techniques to a specific cross-sectional configuration using, for example, commercially available computer-controlled cutting equipment. This equipment is not part-specific and can be used for a wide range of different size shaft seals.

The present invention contemplates an arrangement in which a metal reinforcement element or ring is inserted into the plastic or elastomeric sealing element after formation of the sealing element. The use of plastic or elastomeric molding equipment or metal die tooling is not required in practicing the present invention. The reinforcement element or ring exerts an outward radial pressurizing force on the seal element material thereby ensuring a tight frictional fit of the seal element in an associated shaft housing bore.

The reinforcement ring is preferably formed from a rectangular strip of metal which is bent into an annular configuration with its ends butt-welded together and passed around and through a ring rolling machine to form a tubular or ring-shaped reinforcing member. The tooling used to form the resilient seal element and reinforcement tube is general purpose tooling not restricted to specific component part sizes. Therefore, a range of different size shaft seals can be manufactured with a relatively small tooling expense.

The invention is particularly applicable to low volume seal manufacture where only a small number of given size shaft seals is to be produced in a given time period.

IN THE DRAWINGS

FIG. 1 is a sectional view taken through a shaft seal of the present invention shown installed in a shaft housing.

FIG. 2 is a view in the same direction as FIG. 1, but showing the shaft seal separated from the shaft housing.

FIG. 3 is an exploded view of the FIG. 2 shaft seal, with the metal reinforcement tube detached from the resilient seal element.

FIG. 4 is a fragmentary sectional view taken through an alternate reinforcement tube usable in accordance with the invention.

DETAILED DESCRIPTION OF THE PREFERRED EMBODIMENTS

FIG. 1 shows a shaft seal assembly including an annular one-piece resilient deformable seal element 11 formed from a plastic or elastomeric material, such as resilient urethane plastic, nitrile elastomer, fluoroelastomer or polytetrafluoroethylene. The seal element has a somewhat C-shaped cross sectional configuration defined by a radial web wall 13, an outer axial flange wall 15 extending rightwardly from radial wall 13, and an inner axial flange wall 17 extending rightwardly from radial wall 13 within the space circumscribed by outer wall 15. Outer axial wall 15 has an outer saw-toothed surface 19 adapted to be press-fit within cylindrical axial surface 21 of bore 24 in housing 23. Inner axial wall 17 has an inner V-shaped seal lip 25 adapted to have rotary sliding contact with a circular surface 27 on rotary shaft 29.

Outer axial wall 15 has an inner axial surface 31 spaced radially outwardly from the circumscribed inner wall 17 to form an internal annular cavity 33 within the seal element. A garter spring 35 is insertable into this cavity and into an annular groove 37 in the outer surface of axial wall 17 for biasing lip 25 into sealing contact with shaft surface 27.

As a major feature of the invention, the resilient annular seal element 11 is equipped with an internal annular reinforcement ring or tube 39, preferably formed of a metallic material such as steel. This reinforcement ring is formed separately from the seal element. FIG. 3 shows the reinforcement ring separated from seal element 11, whereas FIG. 2 shows the reinforcement ring installed within the seal element. The reinforcement ring is installed by inserting and press-fitting it into cavity 33, such that outer axial surface 41 of the reinforcement ring has biased engagement with inner axial surface 31 of wall 15.

In a preferred arrangement the outer diameter of ring 39 is slightly greater than the diameter across the inner surface 31 of seal element wall 15 prior to insertion of the ring into cavity 33. During the process of inserting the ring into cavity 33, the material of wall 15 is stretched slightly radially outwardly as an incident of the ring insertion process. Therefore, in the FIG. 2 condition, surface 31 has a slightly greater diameter compared to the condition of FIG. 1 so that some radial stretching of radial wall 13 will occur.

The FIG. 2 seal assembly can be installed into the shaft housing bore by moving the assembly rightwardly so that the saw toothed axial surface 19 telescopically fits within cylindrical bore surface 21. The right end portion of axial surface 19 is beveled, as at 43. A short smooth cylindrical surface area 45 extends leftwardly from the beveled end 43 to form a pilot surface having a diameter slightly less than the diameter of bore surface 21.

The pilot portion of the seal element can be moved freely into housing bore 24. Further rightward motion of the seal assembly causes the saw teeth at 19 to be deflected radially inwardly by engagement with bore surface 21. Stress induced in the seal element material by this compressive deflective action exerts a radially outward reaction force that tends to keep the seal assembly within the housing bore.

Axial surface 19 can have different numbers of saw toothed edges formed thereon, consistent with the available axial space. Each saw tooth has a somewhat V-shaped profile wherein the left side face of each tooth is essentially radial and the right side face is acutely angled to an imaginary axial reference line passing through the tooth tip. The tooth construction facilitates rightward insertion motion of the seal assembly into the housing bore, while tending to prevent leftward displacement of the seal assembly out of the housing bore.

As noted above, it has been attempted to construct shaft seals as one piece resilient elements without any internal reinforcement. However, such seals often became displaced out of the housing bore after a period of service due to a relaxation of the plastic or elastic material such as due to creep. It is theorized that liquid pressure in the zone to the right of the seal in FIG. 1, coupled with some slight wobbling motion of the shaft, can exert a sufficient leftward force on the seal to cause it to walk out of the housing bore. The addition of reinforcement ring 39 prevents this undesired leftward dislocation of the shaft seal out of the housing bore.

Axial wall 15 is subjected to two separate pressurizing or squeezing actions. Ring 39 exerts an outward radial pressurizing force on surface 31 of wall 15. Radial deflection of the saw teeth on surface 19 produces an inward squeezing force on wall 15. Wall 15 is thereby effectively clamped within the housing bore.

The reinforcing ring exerts a pressurizing or biasing force along a substantial portion of the seal element length 47. The length of the reinforcement ring should be at least about ten percent of the seal element length in order to provide an effective reinforcement action.

Reinforcement ring 39 can be formed by slicing sections off of a seamless metal or rigid plastic tube. However, this approach requires many different sized tubes to accommodate the various sized seals which may be machined from a single sized billet. Preferably, however, the ring is formed out of a rectangular metal strip having short end edges and elongated side edges. The end edges are secured together such as by butt-welding to form an endless ring structure. The ring is then forced between and around conventional ring forming rolls for curvature into a round tubular configuration in a known fashion.

In FIG. 3 the abutted ends of the metal strip are referenced by numeral 49. Because the metal strip used to fabricate the reinforcement rings may be cut to any desired length to accommodate any sized ring, only a single roll of metal strip need be on-hand. This results in reduced inventory and significant savings.

The reinforcement ring can be further strengthened by incorporating an endless inwardly radiating reinforcement rib therein, as shown at 51 in FIG. 4. The reinforced ring can be used as an alternate to the ring shown in FIGS. 1 through 3.

Seal element 11 can be formed by a molding process. However, the seal element can also be formed from a cylindrical plastic billet, e.g. by machining a sealing lip from an end section of the billet and then slicing the machined section from the billet as discussed above.

The invention provides a relatively low cost and reliable seal structure where low volume production is contemplated.

Obviously, numerous modifications and variations of the present invention are possible in light of the above teachings. It is therefore to be understood that within the scope of the appended claims, the invention may be practiced otherwise than as specifically described herein.

What is claimed is:

1. A method of manufacturing a caseless shaft seal comprising an annular sealing element supported by a radial reinforcement member, said method comprising:
   providing a plastic or elastomeric billet having an end section;
   machining a sealing lip from said end section of said billet;
   machining an outer axial wall along said end section of said billet for forming a press fit within a bore formed in a seal housing;
   machining an internal cavity in said end section of said billet;

slicing said end section from said billet so as to form said annular sealing element;
providing a metal strip having end portions;
securing said end portions together so as to form a closed ring;
forcing said ring into a round tubular configuration; and
inserting said ring into said internal cavity so as to radially stretch said annular sealing element and secure said ring therein such that said ring provides radial reinforcement to said outer axial wall and maintains said outer axial wall in said press-fit engagement with said bore.

2. The method of claim 1, wherein said ring is forced into said round tubular configuration by passing said ring between ring-forming rolls.

3. The method of claim 1, further comprising machining an annular groove within said internal cavity and inserting a garter spring within said annular groove.

4. The method of claim 1, further comprising machining a plurality of teeth on said outer axial wall for resiliently engaging said bore.

5. The method of claim 1, wherein said caseless shaft seal is manufactured with multi-purpose tooling and wherein said machining is carried out with computer controlled cutting equipment.

* * * * *